(12) United States Patent
Nunan

(10) Patent No.: US 7,041,622 B2
(45) Date of Patent: May 9, 2006

(54) CATALYST, AN EXHAUST EMISSION CONTROL DEVICE AND A METHOD OF USING THE SAME

(75) Inventor: John G. Nunan, Tulsa, OK (US)

(73) Assignee: Delphi Technologies, Inc., Troy, MI (US)

( * ) Notice: Subject to any disclaimer, the term of this patent is extended or adjusted under 35 U.S.C. 154(b) by 203 days.

(21) Appl. No.: 10/358,845

(22) Filed: Feb. 5, 2003

(65) Prior Publication Data

US 2003/0180197 A1 Sep. 25, 2003

Related U.S. Application Data

(60) Provisional application No. 60/355,562, filed on Feb. 6, 2002.

(51) Int. Cl.
*B01J 23/40* (2006.01)
*B01J 23/42* (2006.01)
*B01J 23/58* (2006.01)
*B01J 23/56* (2006.01)
*B01J 23/44* (2006.01)

(52) U.S. Cl. ............ 502/327; 502/328; 502/330; 502/332; 502/333; 502/334; 502/339; 502/355; 502/415; 502/439

(58) Field of Classification Search ............ 502/327, 502/328, 330, 332–334, 339, 355, 415, 439
See application file for complete search history.

(56) References Cited

U.S. PATENT DOCUMENTS 2,838,445 A * 6/1958 Gring et al. ............... 208/138
3,245,919 A * 4/1966 Mooi et al. ............... 502/314
4,102,822 A * 7/1978 Mulaskey ............... 502/322
4,119,571 A * 10/1978 Hegedus et al. ............ 502/333
4,422,960 A * 12/1983 Shiroto et al. ............ 502/206
4,510,261 A * 4/1985 Pereira et al. ............ 502/304
4,510,262 A * 4/1985 Kim et al. ............... 502/304
4,859,433 A    8/1989 Pereira et al.
4,908,344 A * 3/1990 Pereira et al. ............ 502/313
5,597,771 A * 1/1997 Hu et al. ............... 502/304
5,908,800 A    6/1999 Bonneau et al.
5,945,369 A * 8/1999 Kimura et al. ............ 502/304
6,040,265 A    3/2000 Nunan ............... 502/242
6,159,430 A    12/2000 Foster (Continued)

OTHER PUBLICATIONS

Mohamed et al. "Kinetics and Mechanism of Formation of Tricalcium Aluminate, Ca3Al2O6" Thermochimica Acta 6944 (2002) 1-10.

*Primary Examiner*—Cam N. Nguyen
(74) *Attorney, Agent, or Firm*—Paul L. Marshall

(57) ABSTRACT

Disclosed is a catalyst, an emission control device, and a method for treating exhaust gas. In one embodiment, the catalyst comprises: a catalytic metal component and a macro-pore component. The macro-pore component comprises an oxygen storage component and an aluminum oxide component, wherein the oxygen storage component, the aluminum oxide component, or both comprise pores, and wherein greater than or equal to about 40% of a macro-pore component pore volume, based on a total macro-pore component pore volume, is associated with pores greater than 120 Å in diameter. In another embodiment, the method for treating an exhaust gas comprises: contacting the exhaust gas with the catalyst at a temperature and for a period of time sufficient to reduce the concentration of a material in the exhaust gas.

20 Claims, 1 Drawing Sheet

U.S. PATENT DOCUMENTS

| | | | |
|---|---|---|---|
| 6,254,842 B1 * | 7/2001 | Hu et al. | 423/213.5 |
| 6,326,329 B1 | 12/2001 | Nunan | 502/242 |
| 6,338,827 B1 | 1/2002 | Nelson | |
| 6,354,903 B1 | 3/2002 | Nelson | |
| 6,361,821 B1 | 3/2002 | Anderson et al. | |
| 6,391,822 B1 | 5/2002 | Dou et al. | |
| 6,438,839 B1 | 8/2002 | Hardesty et al. | |
| 6,455,463 B1 | 9/2002 | Labarge et al. | |
| 6,464,945 B1 | 10/2002 | Hemingway | |
| 6,464,947 B1 | 10/2002 | Balland | |
| 6,497,847 B1 | 12/2002 | Foster et al. | |
| 6,532,659 B1 | 3/2003 | DeSousa et al. | |
| 6,591,497 B1 | 7/2003 | Foster et al. | |
| 6,605,259 B1 | 8/2003 | Henry | |
| 6,623,704 B1 | 9/2003 | Roth | |
| 6,624,113 B1 | 9/2003 | Labarge et al. | |
| 6,643,928 B1 | 11/2003 | Hardesty et al. | |

* cited by examiner

CATALYST, AN EXHAUST EMISSION CONTROL DEVICE AND A METHOD OF USING THE SAME

CROSS REFERENCE TO RELATED APPLICATIONS

This application claims the benefit of the U.S. Provisional Application Ser. No. 60/355,562 filed Feb. 6, 2002, which is incorporated herein in its entirety.

BACKGROUND

Exhaust emission control devices may comprise catalytic converters, evaporative emissions devices, scrubbing devices (e.g., hydrocarbon, sulfur, and the like), particulate filters, traps, adsorbers, absorbers, non-thermal plasma reactors, and the like, as well as combinations comprising at least one of the foregoing devices. One function of these devices is to treat an exhaust gas, thereby reducing the concentration of at least one component in the gas. Such devices may be rated in terms of their performance, wherein the performance of an exhaust emission control device represents a measure of the ability of that device to reduce the concentration of a component(s) in a gas under various conditions.

Catalytic converters are one type of an exhaust emission control device, and comprise one or more catalytic materials disposed on a substrate. The composition of the catalytic materials, the composition of the substrate, and the method by which the catalytic material is disposed on the substrate serve as one way in which catalytic converters are differentiated from one another. Methods of disposing catalytic material onto a substrate include washcoating, imbibing, impregnating, physisorbing, chemisorbing, precipitating, and combinations comprising at least one of the foregoing disposition methods.

Washcoating includes contacting an admixture of various components of a catalyst with a substrate such that a layer is disposed on and/or in the substrate. The term washcoat as used herein describes the layer or layers of the catalytically active admixture disposed on the substrate. In a three-way conversion catalyst, the washcoat may comprise a metal component, an aluminum oxide component, and an oxygen storage component. Stabilizers, binders, hydrogen sulfide control agents, and the like may also be present in a washcoat. Furthermore, the washcoat may comprise one or more layers of material.

The various components in a washcoat may serve more than one function. For example, the aluminum oxide component (aluminum oxide) in a three way conversion catalyst may act as a support for other components, it may act as a binder within the washcoat or between the washcoat and the substrate, and/or provide a thermally stable porous diluent in the washcoat. The aluminum oxide may also provide catalytic activity of its own. Accordingly, the selection of the components and the various physical properties of the components included in a washcoat may affect the overall catalytic performance of the catalyst. Taking the aluminum oxide component of a three-way conversion catalyst as an example, selection of the aluminum oxide component may have an effect on thermal stability, physical stability, and mass transfer between the gas to be treated and the catalytically active components of the washcoat.

Mass transfer relates to the ability of the exhaust gas to be treated to come in contact and interact with the catalytic materials of the catalyst, and is impacted by, among other variables, available surface area of a material, gas temperature, exhaust gas flow rate, and the like. As such, catalysts, and in particular three way conversion catalysts, may comprise porous materials to impart a larger surface area available for contact by the exhaust gas than would be available using a non-porous material of the same underlying size, shape and dimension. Accordingly, a need remains for further optimization of contact and improved mass transfer between a gas to be treated and a desired catalytic material.

SUMMARY

Disclosed herein are a catalyst and a method for treating exhaust gas. In one embodiment, the catalyst comprises: a catalytic metal component and a macro-pore component. The macro-pore component comprises an oxygen storage component and an aluminum oxide component, wherein the oxygen storage component, the aluminum oxide component, or both comprise pores, and wherein greater than or equal to about 40% of a macro-pore component pore volume, based on a total macro-pore component pore volume, is associated with pores greater than 120 Å in diameter.

In one embodiment, the method for treating an exhaust gas comprises: contacting the exhaust gas with the catalyst at a temperature and for a period of time sufficient to reduce the concentration of a material in the exhaust gas.

In one embodiment, the emission control device comprises: a substrate comprising the catalyst, a housing disposed around the substrate, and a retention material disposed between the housing and the substrate.

The above described and other features are exemplified by the following figure and detailed description.

DETAILED DESCRIPTION

Figure 1:
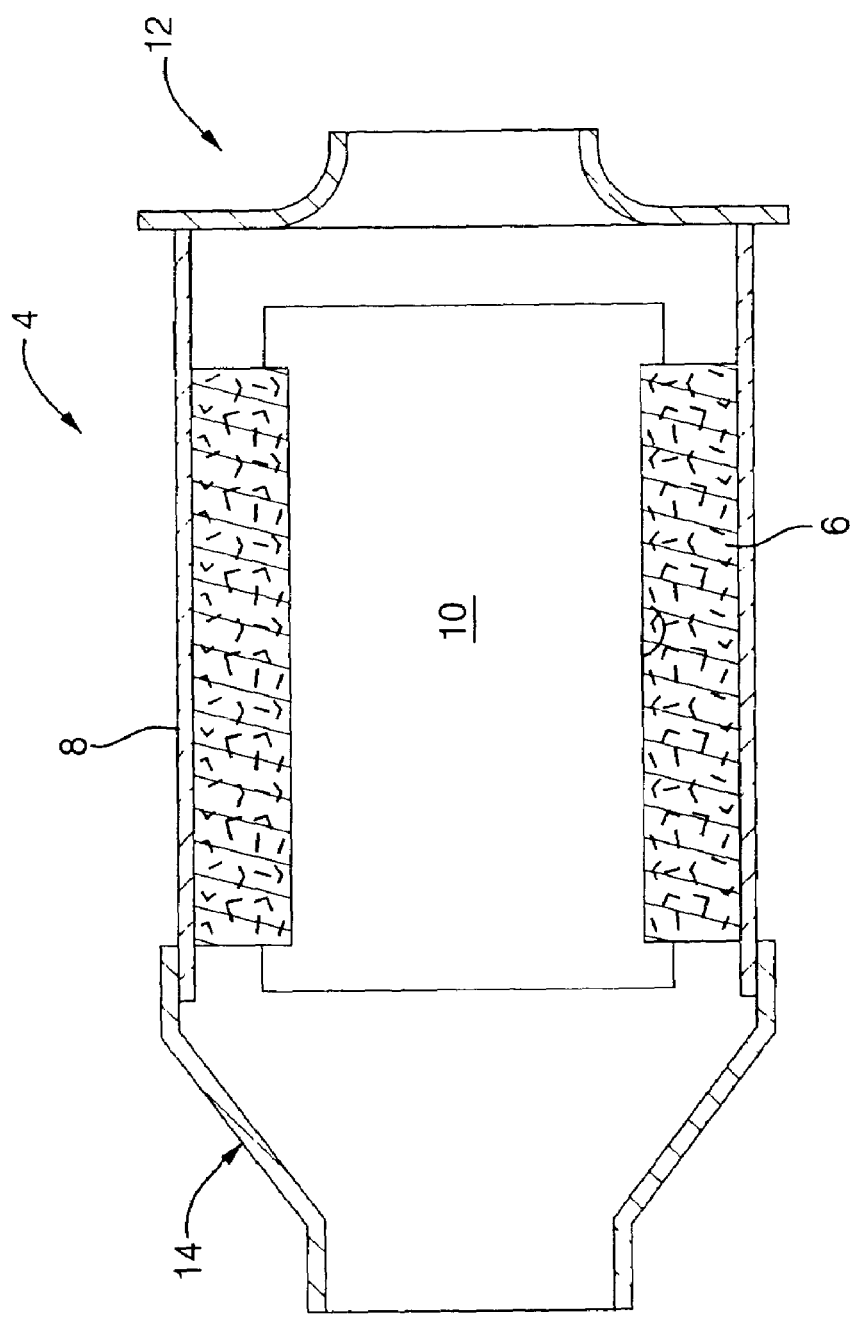
FIG. 1 is a cross-sectional view of an exemplary emission control device.

Three way conversion catalysts include various catalytically active materials and/or components. Such components include one or more catalytically active metals or metal containing components, one or more aluminum oxide components, also referred to herein simply as aluminum oxide or aluminum oxides, and one or more oxygen storage components. Each of these components may have a porosity associated with it. As used herein, porosity is the ratio of the pore volume (i.e., the total volume occupied by the pores in a component) to the total volume occupied by the component. As such, porosity is related to a material's density. The porosity of a component is also classified according to the size of the individual pores defined within the component. As used herein, pores include openings, passageways, and/or interstices both within and between the constituent particles of the component, as well as between the individual components included in the catalyst. Since the diameter of a pore may be irregular (e.g., variably and non-uniform), a pore diameter may reflect an average cross sectional area of a pore, as determined on the surface of the component in which the pore is present.

Classifications based on pore size include micro, meso- and macro-porosity components A micro-pore component has pores less than 20 angstroms (Å) in diameter. A meso-pore component has pores of 20 Å to 120 Å in diameter. A macro-pore component has pores greater than 120 Å in diameter, e.g., at least 40% of the total pore volume of the oxygen storage component(s) and aluminum oxide component(s) is associated with pores which are greater than 120 Å, and preferably are 120 Å to about 1,000 Å in diameter. Preferably, greater than or equal to about 50%, more preferably greater than or equal to about 80% of the pore volume of the macro pore components are associated with pores having diameters of 120 Å to about 1,000 Å. Still more preferred, greater than or equal to about 40%, preferably greater than or equal to about 50%, more preferably greater than or equal to about 80% of the pore volume is associated with pores of about 180 Å to about 800 Å in diameter.

Described herein is a catalyst comprising a macro-pore aluminum oxide component and/or a macro-pore oxygen storage component as defined above. Preferably, the catalyst is a three-way conversion catalyst comprising a macro-pore aluminum oxide and a macro-pore oxygen storage component which is suitable for use in treating a gas in an exhaust emission control device, and which has an improved catalytic performance when compared to a three-way conversion catalyst which does not include a macro-pore aluminum oxide or a macro-pore oxygen storage component.

Improved catalytic performance includes improved thermal stability, faster light-off activity, improved performance of the catalyst to compensate for air to fuel (A/F) transients during accelerations, and improved oxygen storage component performance. Improved performance can be shown from stand-dynometer testing, dynamic oxygen storage component testing, vehicle testing, and the like.

Improved catalytic performance may be achieved through improved mass transfer between a catalyst and the gas to be treated. To improve mass transfer, the availability of a catalytic material for contact by the gas to be treated can be improved. Accordingly, it has been assumed that a catalyst with higher surface area results in improved contact between a gas to be treated (e.g., an exhaust gas) and the catalyst, as compared to a catalyst having less surface area under the same set of conditions. The surface area of a material is directly related to the porosity of that material and the porosity of a material is directly related to the pore size or pore diameter of the pores within that material. Accordingly, it is reasoned that the smaller the pore diameter of the material, the more surface area the material has available for catalytic activity, given an overall total pore volume. However, macro-pore materials have shown an unexpected benefit by providing an improvement of catalytic performance over similar materials having smaller pore diameters. Interestingly, it has been discovered that the increase in surface obtained using, for example, micro-pore and meso-pore components, does not correlate with an improved performance. Thus, disclosed herein is an improvement in catalytic performance obtained using macro-pore components, which runs counter to an expected result.

Not wishing to be bound by theory, it is believed that the improvement in catalytic performance realized when macro-pore components are used, as compared to the performance obtained using similar micro-pore and meso-pore components, results from improved mass transfer between the gas to be treated and the catalytic materials present in and/or on the pores of the macro-pore component (e.g., in the washcoat). Thus, the benefit in performance obtained using macro-pore components is believed to result from improved access and contact of the gas with the active catalytic components disposed in or on the macro-pore aluminum oxide and/or the macro-pore oxygen storage component.

The aluminum oxide of the macro-pore aluminum oxide component may be any aluminum oxide suitable for use in a catalytic converter (e.g., gamma, delta, theta, and alpha aluminum oxide), including stabilized aluminum oxides. If a stabilized aluminum oxide is used, preferably up to about 40 weight percent (wt %) stabilizer may be employed, based on the total weight of the stabilized aluminum oxide. The aluminum oxide component may include a lanthanide (La) stabilized gamma aluminum oxide (referred to herein as La γ-aluminum oxide), a theta-aluminum oxide (referred to herein as θ-aluminum oxide), a barium (Ba) stabilized gamma aluminum oxide, (referred to herein as Ba-γ-aluminum oxide), or a combination comprising at least one of the foregoing aluminum oxides.

The aluminum oxide component preferably comprises pores having pores greater than or equal to about 180 Å in diameter, more preferably greater than or equal to about 220 Å in diameter. Also preferred is a macro-pore aluminum oxide component having pores less than or equal to about 900 Å in diameter, more preferably less than or equal to about 800 Å in diameter, wherein at least 40% of the pore volume of the aluminum oxide component(s), based on the total pore volume is associated with pores of 120 Å to about 1,000 Å in diameter. Preferably, greater than or equal to about 50%, more preferably greater than or equal to about 80% of the pore volume of a macro-pore aluminum oxide component is associated with pores of greater than 120 Å to about 1,000 Å in diameter. Still more preferred, greater than or equal to about 40%, preferably greater than or equal to about 50%, more preferably greater than or equal to about 80% of the total pore volume of a macro-pore aluminum oxide is associated with pores of about 150 Å to about 800 Å in diameter. It is especially preferred that greater than or equal to about 40%, preferably greater than or equal to about 50%, more preferably greater than or equal to about 80% of the total pore volume of a macro-pore aluminum oxide is associated with pores of about 220 Å to about 800 Å in diameter.

The macro-pore aluminum oxide component may have a density of about 0.1 grams per cubic centimeter ($g/cm^3$) to about 2.0 $g/cm^3$. Preferably within this range, the density of the macro-pore aluminum oxide component is greater than or equal to about 0.15 $g/cm^3$, more preferably greater than or equal to about 0.2 $g/cm^3$. Also within this range, the density of the macro-pore aluminum oxide component is preferably less than or equal to about 1.0 $g/cm^3$, more preferably less than or equal to about 0.8 $g/cm^3$.

The surface area of the macro-pore aluminum oxide is preferably greater than or equal to about 40 square meters per gram ($m^2/g$). More preferably, the surface area is greater than or equal to about 50 $m^2/g$, still more preferably greater than or equal to about 80 $m^2/g$.

The oxygen storage component preferably includes ceria (Ce) in a form that exhibits an oxygen storage capability. For example, ceria in a form that is oxidized to $Ce^{4+}$ under lean exhaust gas conditions wherein an excess amount of oxygen is present in the exhaust stream, and that releases oxygen as it is reduced to the $Ce^{3+}$ oxidation state when rich exhaust gas conditions are present. Ceria may also be used as an oxygen storage component in combination with other materials including, for example, lanthanum (La), praseodymium (Pr), neodymium (Nd), niobium (Nb), platinum (Pt), palladium (Pd), rhodium (Rh), iridium (Tr), osmium (Os), ruthenium (Ru), tantalum (Ta), zirconium (Zr), yttrium (Y), nickel (Ni), manganese (Mn), iron (Fe) copper (Cu), silver (Ag), gold (Au), gadolinium (Gd), and combinations comprising at least one of the foregoing metals. Various oxides (e.g., the metal in combination with oxygen (O)) may also be used, including, for example, titania ($TiO_2$), praseodymia ($Pr_6O_{11}$), yttria ($Y_2O_3$), neodynia ($Nd_2O_3$), lanthana ($La_2O_3$), gadolinium oxide ($Gd_2O_3$), or mixtures comprising at least one of the foregoing.

Preferred oxygen storage components include those represented by the formula ($Ce_aZr_bLa_cY_dPr_eO_x$), wherein subscripts a, b, c, d, e, and x, represent atomic fractions, subject to the proviso that (a+b+c+d+e=1). In addition, the value of "a" may be about 0.05 to about 0.6. Within this range, a value of less than or equal to about 0.5 may be employed, with less than or equal to about 0.4 preferred, and less than or equal to about 0.3 more preferred. Also preferred within this range is a value for "a" of greater than or equal to about 0.1, with greater than or equal to about 0.15 more preferred, and greater than or equal to about 0.20 especially preferred. Also: "b" may be less than or equal to about 0.95, with about 0.40 to about 0.8 preferred; "c" may be less than or equal to about 0.15, with about 0.03 to about 0.1 preferred; "d" may be less than or equal to about 0.15, with about 0.03 to about 0.1 preferred; "e" may be less than or equal to about 0.15, with about 0.03 to about 0.1 preferred; and "x" may be less than or equal to about 2.0. The precise value for "x" depends on the type of metal component, its charge, atomic fraction, and the requirement that the metal oxide have a neutral overall charge. Examples of preferred oxygen storage components include, for example, $Ce_{0.376}Zr_{0.50}La_{0.086}Pr_{0.038}O_{1.95}$ and $Ce_{0.25}Zr_{0.65}La_{0.04}Y_{0.06}O_{1.95}$.

The macro-pore oxygen storage component(s) preferably have pore volume associated with pores of greater than or equal to about 130 Å in diameter, more preferably greater than or equal to about 200 Å in diameter. Also preferred is a macro-pore oxygen storage component having pores of less than or equal to about 900 Å in diameter, more preferably less than or equal to about 800 Å in diameter, wherein at least 40% of the total pore volume of the oxygen storage component, are associated with pores of 120 Å to about 1,000 Å in diameter. Preferably, greater than or equal to about 50%, more preferably greater than or equal to about 80% of the total pore volume of the oxygen storage component are associated with pores of greater than 120 Å to about 1,000 Å in diameter. Still more preferred, greater than or equal to about 40%, preferably greater than or equal to about 50%, more preferably greater than or equal to about 80% of the pore volume of the oxygen storage component is associated with pores of about 180 Å to about 800 Å in diameter.

The macro-pore oxygen storage component may have a density of about 0.1 $g/cm^3$ to about 2.0 $g/cm^3$. Preferably within this range, the density of the macro-pore oxygen storage component is greater than or equal to about 0.2 $g/cm^3$, more preferably greater than or equal to about 0.3 $g/cm^3$. Also within this range, the density of the macro-pore oxygen storage component is preferably less than or equal to about 1.0 $g/cm^3$, more preferably less than or equal to about 0.8 $g/cm^3$.

The surface area of the macro-pore oxygen storage component is preferably greater than or equal to about 20 square meters per gram ($m^2/g$). More preferably, the surface area is greater than or equal to about 30 m 2/g, still more preferably greater than or equal to about 40 $m^2/g$.

The washcoat may also include other promoters, stabilizers and the like, and is preferably disposed on a substrate suitable for use in an exhaust emissions control device. The thickness of the washcoat is preferably not sufficient to create an amount of backpressure detrimental to performance, while still being of a thickness sufficient to provide for a durable catalyst. A washcoat thickness of about 20 to about 170 micrometers per washcoat layer is preferred.

Suitable substrates may comprise any material designed for use in the intended environment, (e.g., in a spark ignition or diesel engine environment, in an exhaust flue, and the like) and having the following characteristics: (1) capable of operating at temperatures up to about 600° C., and up to about 1,110° C. for some applications, depending upon the device's location within the exhaust system (manifold mounted, close coupled, or under floor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst, if desired. Some possible materials include cordierite, silicon carbide, metal, metal oxides (e.g., aluminum oxide, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials may be in the form of foils, perform, mat, fibrous material, monoliths (e.g., a honeycomb structure, and the like), other porous structures (e.g., porous glasses, sponges), foams, pellets, particles, molecular sieves, and the like (depending upon the particular device), and combinations comprising at least one of the foregoing materials and forms, e.g., metallic foils, open pore aluminum oxide sponges, and porous ultra-low expansion glasses.

Although the substrate can have any size or geometry, the size and geometry are preferably chosen to optimize surface area in the given exhaust emission control device design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Deposition through washcoating is the preferred method of disposing the catalytic materials onto the substrate. However, other suitable methods including imbibing, impregnating, physisorbing, chemisorbing, precipitating, and combinations comprising at least one of the foregoing disposition methods may also be used.

Located between the substrate and a housing (e.g., a shell) can be a retention material that insulates the shell from both the high exhaust gas temperatures and the exothermic catalytic reaction occurring within the substrate. The retention material, which enhances the structural integrity of the substrate by applying compressive radial forces about it, reducing its axial movement and retaining it in place, is typically concentrically disposed around the substrate to form a retention material/substrate subassembly.

The retention material, which can be in the form of a mat, particulates, or the like, can either be an intumescent material (e.g., a material that comprises vermiculite component, i.e., a component that expands upon the application of heat), a non-intumescent material, or a combination thereof. These materials can comprise ceramic materials (e.g., ceramic fibers) and other materials such as organic and inorganic binders and the like, or combinations comprising at least one of the foregoing materials.

Possible types of exhaust emission control devices include catalytic converters, evaporative emissions devices, scrubbing devices (e.g., hydrocarbon, sulfur, and the like), particulate filters/traps, adsorbers, absorbers, plasma reactors (e.g., non-thermal plasma reactors), and the like, as well as combinations comprising at least one of the foregoing devices. An exemplary emission control device is illustrated in FIG. 1. The device 4 comprises a housing 8 disposed around a substrate 10 comprising the catalyst, with a retention material 6 disposed therebetween. One end of the device 4 has an endcone 14, while the opposite end has an endplate 12.

EXAMPLES

The following examples are for illustrative purposes only and are not intended to limit the scope of the present invention.

Several comparative examples were prepared from washcoats using comparative (i.e., micro-pore and meso-pore components). The comparative components included meso-pore aluminum oxide components and meso-pore oxygen storage components. Several examples were also prepared comprising macro-pore aluminum oxide components, macro-pore oxygen storage components, or both. The performance of each of these catalysts was evaluated after initial aging protocols to simulate up to 100,000 miles of road aging.

The aging protocols used included exposing the catalyst to temperatures less than or equal to about 1,050° C., along with exposing the catalyst to exhaust gas of various compositions. Aging also included exposing the catalyst to an exhaust gas having a stoichiometric composition (i.e., an air to fuel ratio of about 14.5), to an exhaust gas having stoichiometrically high concentrations of oxygen for so called "lean aging conditions" (i.e., an air to fuel ratio of about 14.7), and an exhaust gas having stoichiometrically high concentrations of hydrocarbons (HC) and carbon monoxide (CO) for so called "rich aging conditions" (i.e., an air to fuel ratio of about 14.25). The catalysts were aged in groups of four wherein the exhaust from the test engine was split evenly between the four examples, thus allowing parallel aging under identical conditions of at least one comparative example (i.e., a reference) and up to three examples.

After aging, the catalysts were evaluated on a stand dynamometer for light-off performance and for air to fuel traverse activity to simulate sudden accelerations and decelerations common in vehicle operation. The dynamic oxygen storage component properties were also evaluated. The light-off performance of the catalysts are summarized in the tables that follow and is represented as $T_{50\%}$, which is the temperature that 50% conversion of HC, CO and $NO_x$ to their respective target materials of $H_2O$, $CO_2$, and $N_2$ was obtained. Thus, the lower the $T_{50\%}$ temperature is, the better the performance.

Air to fuel traverse performance is summarized in terms of percent conversion of the exhaust gas stream: (1) at stoichiometry (air to fuel ratio of 14.56); (2) as the exhaust gas stream is varied between an air to fuel ratio of about 14.71 to about 14.41; and (3) when the exhaust gas stream is on the "rich side", having an air to fuel ratio of about 14.25.

Also summarized is data for the air to fuel ratio $CO/NO_x$ cross over point (COP), defined as the point at which the value of CO and $NO_x$ conversions are equal. Different three way conversion catalysts have different values for the COP value because the A/F traverse curves for CO/HC are typically distinct from NOx in that opposite sensitivities with respect to varying A/F values are observed. Thus, on the rich side there is low conversions for CO & HC due to the excess of reductants (but high conversion of NOx); while on the lean side, there is observed high conversion for HC and CO due to the excess of oxygen (but low conversion of NOx due to the presence of an excess amount of oxygen). The COP value thus represents the best compromise in A/F value for maximum conversion of the CO/HC and NOx components in an exhaust gas stream. Accordingly, a higher value for COP is preferred.

The oxygen storage component performance is summarized herein as a switching time, which is a qualitative measure of how effective the catalyst is at buffering sudden changes in the air to fuel ratio during a rich to lean transient, and during a lean to rich transient (as occur during normal acceleration and deceleration while driving an automobile). Longer switching times are preferred, as they represent greater oxygen storage component capacity and buffering capability of the catalyst.

Finally, performance of the various catalysts is compared using both North American and European vehicle test methods. The results are presented in terms of Bag Tailpipe Emissions, which are reported in terms of grams per mile (g/mile) or grams per kilometer (g/km) and in terms of the overall percent conversion of the materials present in the exhaust gas stream. The North American test method used herein comports with the standard Federal Test Procedures (FTP), and the European test method used comports with standard ECE/EUDC (European Protocol) test methods. The Federal Test Procedure used two North American vehicles, namely a 3.1 L, V-6 Chevy Lumina with 1998 EMS Calibration, and a 2.2 L L-4 2000 Model Year Saturn with LEV calibration. The ECE/EUDC testing was done using a 1.6 L, 16V, 2000 Model Year Renault Clio, with EURO-III calibration. Catalysts aged using a high temperature rich-lean-stoichiometric aging, (termed non fuel-cut aging) were evaluated on the Chevy Lumina or Saturn vehicle. The aging was done on a Chevrolet 7.4L V-8 engine with a closed loop wide range sensor control and multi-point fuel injection. The aging cycle included a 20 second stoichiometric mode with catalyst bed temperature T=950° C., a six second rich mode (A/F=13.15); a 10 second lean (A/F=14.8) exothermic mode with bed temperature T=1,050° C., and finally a 4 second lean (A/F=16.15) mode with secondary air added. Catalysts aged according to the fuel cut protocol were evaluated on the Renault Clio. This latter aging cycle consists of two modes. The first is a 300 second cruise in which the engine operates rich with secondary air injection to give a stoichiometric exhaust gas composition at the catalyst inlet. The second mode is 320 seconds long, also operated with the engine running rich with secondary air injection, but in addition, a fuel cut occurs every 30 seconds. During the cruise mode the exhaust gas composition is at stoichiometry at the catalyst inlet, the inlet temperature is 675° C. with a bed temperature T is 1,000° C. For the cruise mode with fuel cut the bed temperature is also at 1,000° C. before the fuel cut.

The light-off and A/F traverse activity measurements were measured on a Ford 5.0L MPFI (multi-port fuel injection) engine. The engine speed was 1,800 RPM with catalyst inlet CO, $O_2$, NOx and HC concentrations of 0.62%, 0.6%, 1800 parts per million (ppm) and 1900 ppm respectively. The mean A/F ratio during the test was 14.56 with an A/F oscillation amplitude of ±0.65 A/F units at a frequency of 1.0 Hz. The temperature ramp was generated by diverting the exhaust through a heat exchanger. The temperature traverse ramp consisted of a ramp from 200 to 450° C. at a rate of 51° C. per minute with a gas hourly space velocity (GHSV) of 35,000 $h^{-1}$, defined as the volume of gas flowing at standard temperature and pressure per geometric volume of catalysts per hour.

Two types of A/F traverse test were carried out. The first test utilized a catalyst inlet temperature of 400° C. and a GHSV of 35,000 h$^{-1}$. Again a 5.0L Ford MPFI engine was used for the test at an engine speed of 1800 RPM. The traverse test consists of a continuous A/F sweep from A/F=15.2 to 13.8 at 0.131 A/F units per minute. During the test the A/F modulation was ±0.65 A/F units at a frequency 1 Hz. The second A/F traverse test was run in a similar manner but under different conditions of temperature, GHSV and A/F modulation. The catalyst inlet temperature was 482° C., the A/F modulation was ±0.8 A/F units at 1 Hz and the GHSV was 42,000 h$^{-1}$.

Several catalyst formulations were prepared for testing as follows: the aluminum oxide to oxygen storage component (OSC) weight ratio was held constant for all catalysts so that comparisons could be made on an equal weight basis of aluminum oxide and OSC, the only difference being the pore size distribution of the various components. Overall, three types of catalyst architecture were studied:

Catalyst A—Single Layer Pd Washcoat with a Surface Rh Impregnation.

The coating slurry was prepared by adding Pd nitrate to deionized water followed by slow addition of the OSC component. The resultant slurry was stirred for 60 minutes followed by addition of the aluminum oxide component. After mixing for 30 minutes, a binder consisting of a dispersed "boehmite sol" was added followed by BaSO$_4$. The resultant slurry was milled (using a Sweco-type mill) such that the minimum particle size was greater than 2 micrometers; the 90% distribution was 6.5 to 8.5 micrometers, and 100% pass was less than 30 micrometers. The slurry specific gravity was in the range of 1.49 to 1.52. Parts were coated by dipping one end of a honeycomb ceramic monolith into the washcoat slurry, followed by drawing the slurry up into the channels using vacuum. The part was then removed from the slurry and the channels cleared by applying a vacuum to the other end of the part. Washcoat loading was controlled by varying specific gravity, and other coating parameters such as vacuum time and the amount of slurry drawn into the honeycomb channels. After applying the washcoat, the parts were calcined at 540° C. for 2 hours. The weight ratio of binder: aluminum oxide:BaSO$_4$:OSC in the final calcined washcoat was 1:9:1.76:8.8 respectively, with a final calcined washcoat loading of 3.54 g/in$^3$. The Rh metal was then applied to penetrate only the first 10 micrometers of the washcoat layer.

Catalyst B—Pd/Rh Two Layer Catalyst

The Pd and Rh washcoats were prepared and applied to the ceramic honeycomb monoliths exactly as described above for the single, 1-layer Pd/Rh catalysts. The OSC component used in the Rh layer contained an increased amount of Zr compared to the OSC component used in the Pd layer. The weight ratio of aluminum oxide/OSC in the Pd layer was 1.0 and 0.75 in the Rh layer.

Catalyst C—Pt/Rh One Layer Catalysts

A slurry was prepared by adding BaSO$_4$ to water along with a small amount of HNO$_3$. The aluminum oxide was then added followed by the OSC component and the binder. During the powder additions, the pH was held constant in the range of 4.9–5.2 with HNO$_3$. Sucrose was then added at 10 wt %, based on the total content of solids. The slurry was then milled (using a Sweco type mill) such that the minimum particle size was greater than 2.0 micrometers; the 90% distribution was 6.0 to 7.5 micrometers, and 100% pass was less than 35 micrometers. After milling, the slurry was weighed and the loss on ignition (LOI) was measured at 540° C. to determine the calcined dry solid content. Pt was added as a nitrate salt drop wise into a mixing slurry vortex over a time period of 30 minutes. The Rh was added as a nitrate salt in a similar fashion. The slurry was then aged for a minimum of one hour after which it was applied to the ceramic honeycomb monolith as described above. The weight ratio of binder:aluminum oxide:BaSO$_4$:OSC was 1:5:1.5:12.5 respectively in the finished calcined washcoat.

The Examples and Comparative Examples listed in Tables 2A and 2B were produced from the materials listed in Table 1 below.

TABLE 1

| Component No. | Type Of Component | Composition | Average Pore Diameter (Å) | Surface Area (m$^2$/g) | Density (g/cm$^3$) |
|---|---|---|---|---|---|
| CPN1 | Macro-pore oxygen Storage Component | Ce$_{0.376}$Zr$_{0.50}$La$_{0.086}$Pr$_{0.038}$O$_{1.95}$ | 117 | 76 | |
| CPN2 | Macro-pore oxygen Storage Component | Ce$_{0.25}$Zr$_{0.65}$La$_{0.04}$Y$_{0.06}$O$_{1.95}$ | 132 | 71 | |
| CPN3 | Comparative Oxygen Storage Component | Ce$_{0.376}$Zr$_{0.50}$La$_{0.086}$Pr$_{0.038}$O$_{1.95}$ | 97 | 69 | |
| CPN4 | Comparative Oxygen Storage Component | Ce$_{0.376}$Zr$_{0.50}$La$_{0.086}$Pr$_{0.038}$O$_{1.95}$ | <100 | 69 | |
| CPN5 | Comparative Oxygen Storage Component | Ce$_{0.23}$Zr$_{0.69}$La$_{0.08}$O$_{1.96}$ | <100 | 77 | |
| CPN6 | Comparative Oxygen Storage Component | Ce$_{0.25}$Zr$_{0.65}$La$_{0.04}$Y$_{0.06}$O$_{1.95}$ | 108 | 78 | 0.38 |
| CPN7 | Macro-pore Aluminum oxide Component | γ-aluminum oxide | 213 | 161 | 0.45 |
| CPN8 | Macro-pore Aluminum oxide Component | La-γ-aluminum oxide | 200 | 160 | 0.42 |

TABLE 1-continued

| Component No. | Type Of Component | Composition | Average Pore Diameter (Å) | Surface Area (m²/g) | Density (g/cm³) |
|---|---|---|---|---|---|
| CPN9 | Macro-pore Aluminum oxide Component | θ-aluminum oxide | 274 | 89 | 0.43 |
| CPN10 | Comparative Aluminum oxide Component | La-γ-aluminum oxide | 157 | 200 | |
| CPN11 | Comparative Aluminum oxide Component | La-γ-aluminum oxide | 140 | 150 | 0.42 |
| CPN12 | Comparative Aluminum oxide Component | θ-aluminum oxide | 137 | 104 | |
| CPN13 | Comparative Aluminum oxide Component | Ba-γ-aluminum oxide | 129 | 151 | 0.29 |

TABLE 2A

| | FIRST LAYER | | SECOND LAYER | | |
|---|---|---|---|---|---|
| Ex[1] | Oxygen Storage Component | Aluminum oxide | OSC | Aluminum oxide | ML[2] (g/ft³) |
| C1 | (CPN3) $Ce_{0.376}Zr_{0.50}La_{0.086}Pr_{0.038}O_{1.95}$ | (CPN10) La-γ-aluminum oxide | — | — | 40 |
| C2 | (CPN3) $Ce_{0.376}Zr_{0.50}La_{0.086}Pr_{0.038}O_{1.95}$ | (CPN11) La-γ-aluminum oxide | — | — | 40 |
| C3 | (CPN3) $Ce_{0.376}Zr_{0.50}La_{0.086}Pr_{0.038}O_{1.95}$ | (CPN13) Ba-γ-aluminum oxide | — | — | 40 |
| 4 | (CPN3) $Ce_{0.376}Zr_{0.50}La_{0.086}Pr_{0.038}O_{1.95}$ | (CPN7) γ-aluminum oxide | — | — | 40 |
| C5 | (CPN3) $Ce_{0.376}Zr_{0.50}La_{0.086}Pr_{0.038}O_{1.95}$ | (CPN10) La-γ-aluminum oxide | (CPN6) $Ce_{0.25}Zr_{0.65}La_{0.04}Y_{0.06}O_{1.95}$ | (CPN10) La-γ-aluminum oxide | 40 |
| 6 | (CPN1) $Ce_{0.376}Zr_{0.50}La_{0.086}Pr_{0.038}O_{1.95}$ | (CPN10) La-γ-aluminum oxide | (CPN6) $Ce_{0.25}Zr_{0.65}La_{0.04}Y_{0.06}O_{1.95}$ | (CPN12) θ-aluminum oxide | 40 |
| C7 | (CPN4) $Ce_{0.376}Zr_{0.50}La_{0.086}Pr_{0.038}O_{1.95}$ | (CPN10) La-γ-aluminum oxide | (CPN6) $Ce_{0.25}Zr_{0.65}La_{0.04}Y_{0.06}O_{1.95}$ | (CPN12) θ-aluminum oxide | 40 |
| 8 | (CPN3) $Ce_{0.376}Zr_{0.50}La_{0.086}Pr_{0.038}O_{1.95}$ | (CPN10) La-γ-aluminum oxide | (CPN1) $Ce_{0.25}Zr_{0.65}La_{0.04}Y_{0.06}O_{1.95}$ | (CPN12) θ-aluminum oxide | 40 |
| C9 | (CPN3) $Ce_{0.376}Zr_{0.50}La_{0.086}Pr_{0.038}O_{1.95}$ | (CPN10) La-γ-aluminum oxide | (CPN6) $Ce_{0.25}Zr_{0.65}La_{0.04}Y_{0.06}O_{1.95}$ | (CPN10) La-γ-aluminum oxide | 40 |
| 10 | (CPN1) $Ce_{0.376}Zr_{0.50}La_{0.086}Pr_{0.038}O_{1.95}$ | (CPN7) γ-aluminum oxide | — | — | 40 |
| 11 | (CPN1) $Ce_{0.25}Zr_{0.65}La_{0.04}Y_{0.06}O_{1.95}$ | (CPN7) γ-aluminum oxide | — | — | 40 |
| 12 | (CPN2) $Ce_{0.25}Zr_{0.65}La_{0.04}Y_{0.06}O_{1.95}$ | (CPN8) La-γ-aluminum oxide | — | — | 40 |
| C13 | (CPN3) $Ce_{0.376}Zr_{0.50}La_{0.086}Pr_{0.038}O_{1.95}$ | (CPN10) La-γ-aluminum oxide | (CPN6) $Ce_{0.25}Zr_{0.65}La_{0.04}Y_{0.06}O_{1.95}$ | (CPN10) La-γ-aluminum oxide | 40 |

[1] Ex - Example Number
[2] ML - Metal Loading

TABLE 2B

| Ex[1] | FIRST LAYER | | SECOND LAYER | | ML[2] (g/ft$^3$) |
|---|---|---|---|---|---|
| | Oxygen Storage Component | Aluminum oxide | OSC | Aluminum oxide | |
| 14 | (CPN1) $Ce_{0.376}Zr_{0.50}La_{0.086}Pr_{0.038}O_{1.95}$ | (CPN10) La-γ-aluminum oxide | (CPN2) $Ce_{0.25}Zr_{0.65}La_{0.04}Y_{0.06}O_{1.95}$ | (CPN10) La-γ-aluminum oxide | 40 |
| 15 | (CPN1) $Ce_{0.376}Zr_{0.50}La_{0.086}Pr_{0.038}O_{1.95}$ | (CPN7) γ-aluminum oxide | (CPN2) $Ce_{0.25}Zr_{0.65}La_{0.04}Y_{0.06}O_{1.95}$ | (CPN9) θ-aluminum oxide | 40 |
| 16 | (CPN1) $Ce_{0.376}Zr_{0.50}La_{0.086}Pr_{0.038}O_{1.95}$ | (CPN7) γ-aluminum oxide | (CPN2) $Ce_{0.25}Zr_{0.65}La_{0.04}Y_{0.06}O_{1.95}$ | (CPN7) γ-aluminum oxide | 40 |
| C17 | (CPN5) $Ce_{0.23}Zr_{0.69}La_{0.08}O_{1.96}$ | (CPN10) La-γ-aluminum oxide | — | — | 25 |
| 18 | (CPN2) $Ce_{0.25}Zr_{0.65}La_{0.04}Y_{0.06}O_{1.95}$ | (CPN10) La-γ-aluminum oxide | — | — | 25 |
| 19 | (CPN2) $Ce_{0.25}Zr_{0.65}La_{0.04}Y_{0.06}O_{1.95}$ | (CPN7) γ-aluminum oxide | — | — | 25 |
| C20 | (CPN5) $Ce_{0.23}Zr_{0.69}La_{0.08}O_{1.96}$ | (CPN 10) La-γ-aluminum oxide | — | — | 40 |

[1]Ex - Example Number
[2]ML - Metal Loading

The test results are summarized in Tables 3 to 22 that follow. Performance of several three way conversion catalyst washcoats having comparative aluminum oxide components and comparative oxygen storage components are directly compared to three way conversion catalyst washcoats having at least one macro component.

Table 3 shows light-off and air to fuel traverse performance data of four-three way conversion catalysts having a single layer architecture, and comprising Pd and Rh, where the only difference between these four examples is the aluminum oxide type used. The Pd and Rh loading was about 40 g/ft$^3$ at a 0:5:1 (Pt:Pd:Rh) ratio. The catalyst volume was about 75 in$^3$ and a non-fuel cut aging for 100 Hrs was used. The test was conducted at 482° C. using an air to fuel (A/F) amplitude of ±0.8 A/F units at 1 Hz. The gas hourly space velocity (GHSV) was about 42,000 per hour (h$^{-1}$).

TABLE 3

| Component tested | Example Number | | | |
|---|---|---|---|---|
| | C1 | C2 | C3 | 4 |
| Cross Over Point (% Conversion) | | | | |
| | 65.7 | 78.9 | 57.9 | 87.5 |
| A/F Traverse Performance Data (% Conversion) Integral conversions in A/F range 14.71 to 14.41 | | | | |
| HC | 96 | 97 | 96 | 97 |
| CO | 61 | 77 | 48 | 82 |
| NOx | 70 | 79 | 65 | 84 |

TABLE 3-continued

| Component tested | Example Number | | | |
|---|---|---|---|---|
| | C1 | C2 | C3 | 4 |
| Air to Fuel Ratio of 14.56 | | | | |
| HC | 96 | 97 | 96 | 97 |
| CO | 63 | 85 | 50 | 88 |
| NOx | 70 | 78 | 63 | 85 |
| Air to Fuel Ratio of 14.25 | | | | |
| HC | 96 | 96 | 95 | 95 |
| CO | 26 | 25 | 22 | 23 |
| NOx | 92 | 98 | 88 | 97 |
| $T_{50\%}$ Conversion | | | | |
| HC | 403 | 393 | 415 | 395 |
| CO | 441 | 413 | >450 | 412 |
| NOx | 398 | 390 | 414 | 394 |

The data in Table 3 show that the catalyst that contains the macro γ-$Al_2O_3$ component as having the best overall activity, both in terms of the lowest light-off temperature and highest hydrocarbon (HC), carbon monoxide (CO), and nitrogen oxides (NO$_x$) conversion. For example, comparison of the macro catalyst to the comparative catalysts has an 8.6% improvement in COP while maintaining or exceeding conversion percentages. With the macro catalyst, a COP of greater than or equal to about 85% may be obtained.

Tables 4 and 5 show results of the Federal Testing Procedure (FTP) of Comparative Examples 1, 2, and 3, along with Example 4. Presented are the Bag Tailpipe Emissions for non-methane hydrocarbon (NMHC), carbon monoxide (CO), and nitrogen oxides (NO$_x$), along with the average percent conversions over the FTP test. Table 4 shows a single layer Pd and Rh catalyst wherein the Pd and Rh are about 40 g/ft$^3$ at 0:5:1 (Pt:Pd:Rh) ratio. A non fuel cut aging for 100 hours was used. FTP testing was done on a 3.1 L, V-6 vehicle with 1998 EMS Calibration.

TABLE 4

| | Bag Tailpipe Emissions g/mile (% Conversion) | | |
|---|---|---|---|
| Example | NMHC | CO | $NO_x$ |
| C1 | 0.166 (92.1) | 2.75 (76.9) | 0.503 (76.2) |
| C2 | 0.137 (93.5) | 1.92 (84.4) | 0.337 (84.5) |
| C3 | 0.143 (92.8) | 2.02 (83.1) | 0.647 (73.9) |
| 4 | 0.115 (94.6) | 1.60 (86.1) | 0.248 (92.0) |

Table 5 again shows FTP results for the same samples as in Table 4 but testing was done on a 2.2 L L-4 vehicle with LEV 2000 EMS calibration.

TABLE 5

| | Bag Tailpipe Emissions g/mile (% Conversion) | | |
|---|---|---|---|
| Example | NMHC | CO | $NO_x$ |
| C1 | 0.068 (91.7) | 3.40 (72.9) | 0.481 (84.5) |
| C2 | 0.072 (91.7) | 2.75 (79.4) | 0.233 (93.2) |
| C3 | 0.065 (92.6) | 2.12 (83.4) | 1.152 (62.7) |
| 4 | 0.069 (92.0) | 2.45 (81.5) | 0.176 (94.6) |

Tables 4 and 5 show that the catalyst comprising the macro γ-$Al_2O_3$ component as having the lowest overall tailpipe emissions, the highest overall average conversions, and an improvement in percent NOx conversion.

Tables 6, 7, and 8 show stand-dynamometer light-off and A/F traverse activity test results, dynamic OSC and vehicle testing performance, respectively. Examples C5 and C7, and Examples 6 and 8, all have a two-layer catalyst architecture. The oxygen storage component in Examples C5 and C7 is replaced with a macro-pore oxygen storage component in Examples 6 and 8. In each case, the macro catalyst either maintains or exceeds the performance of the comparative examples, especially in terms of CO and NOx percent conversion.

Specifically, a macro porous oxygen storage component comprising $Ce_{0.376}Zr_{0.50}La_{0.086}Pr_{0.038}O_{1.95}$ and $Ce_{0.25}Zr_{0.65}La_{0.04}Y_{0.06}O_{1.95}$ were used with a Pd and Rh loading of 40 g/$ft^3$ at a 0:5:1 (Pt:Pd:Rh) ratio. The catalyst volume was about 75 cubic inches ($in^3$). Table 6 shows non fuel cut aging for 100 hours and testing at 482° C. with an air/fuel amplitude of plus or minus (±) 0.8 A/F units@1 Hz. The GHSV was 42,000 $h^{-1}$.

TABLE 6

| | Example Number | | | |
|---|---|---|---|---|
| COP | C5 | 6 | C7 | 8 |
| Cross Over Point (% Conversion) | | | | |
| | 72.9 | 87.2 | 81.5 | 99.7 |
| A/F Traverse Performance Data (% Conversion) | | | | |
| Integral conversions in A/F range 14.71 to 14.41 | | | | |
| HC | 95 | 96 | 95 | 97 |
| CO | 68 | 82 | 77 | 92 |
| NOx | 78 | 85 | 82 | 91 |
| Air to Fuel Ratio of 14.56 | | | | |
| HC | 95 | 96 | 96 | 98 |
| CO | 71 | 87 | 82 | 100 |
| NOx | 80 | 88 | 85 | 100 |
| Air to Fuel Ratio of 14.25 | | | | |
| HC | 94 | 95 | 94 | 92 |
| CO | 25 | 29 | 27 | 26 |
| NOx | 97 | 100 | 99 | 100 |
| $T_{50\%}$ Conversion | | | | |
| HC | 404 | 389 | 397 | 361 |
| CO | 417 | 398 | 407 | 365 |
| NOx | 407 | 389 | 498 | 351 |

In Table 7, non fuel cut aging for 100 hrs was done prior to testing as above.

TABLE 7

| | Oxygen Storage Component Switching Time (sec) | |
|---|---|---|
| Example Number | RICH → LEAN | LEAN → RICH |
| C5 | 0.9 | 0.7 |
| 6 | 2.0 | 1.5 |
| C7 | 1.3 | 1.0 |
| 8 | 4.8 | 1.4 |

Table 8 shows data from non fuel cut aging for 100 hrs, using FTP testing on a 3.1 L, V-6 vehicle with 1998 EMS Calibration.

TABLE 8

| | Bag Tailpipe Emissions g/mile (% Conversion) | | |
|---|---|---|---|
| Example Number | NMHC | CO | NOx |
| C5 | 0.257 (87.2) | 3.11 (73.4) | 0.550 (71.2) |
| 6 | 0.196 (90.6) | 2.40 (80.6) | 0.359 (82.7) |
| C7 | 0.206 (90.2) | 2.75 (77.6) | 0.429 (79.2) |
| 8 | 0.152 (92.5) | 2.25 (81.7) | 0.144 (92.5) |

The best performance is observed when the macro-pore oxygen storage component is present in the Rh layer in terms of switching time, tail-pipe emissions, and conversion of NMHC, CO and $NO_x$.

Tables 9–13 show the performance benefits of both a macro-pore aluminum oxide component and a macro-pore oxygen storage component in the wash coat. Examples 10, 11, and 12 are single layer catalysts and are directly compared to Example C9, which is a 2-layer system having comparative aluminum oxide and oxygen storage component materials (i.e., components that are not macro components) in both layers. The improved performance of Examples 10, 11 and 12 over the comparative 2-layer three way conversion catalyst (Example C9) is greatly unexpected. Two layer Pd/Rh architecture would be expected to have higher performance over a single layer three way conversion catalyst, especially after "fuel-cut" and/or "lean stoichiometric" aging.

Table 9 shows a macro porous oxygen storage component and a macro-porous aluminum oxide included together in the wash coat. The Pd and Rh loading are about 40 g/ft$^3$ at a 0:5:1 (Pt:Pd:Rh) ratio. The catalyst volume is 75 in$^3$. The testing temperature is about 400° C. at an air/fuel ratio of ±0.6 A/F units at 1 Hz. The GHSV was 35,000 h$^{-1}$. In Table 9, non fuel-cut aging was conducted for 100 hrs.

TABLE 9

| | Example Number | | | |
|---|---|---|---|---|
| COP | C9 | 10 | 11 | 12 |
| Cross Over Point (% Conversion) | | | | |
| | 74.6 | 97.1 | 95.8 | 97.7 |
| A/F Traverse Performance Data (% Conversion) | | | | |
| Integral conversions in A/F range 14.71 to 14.41 | | | | |
| HC | 92 | 96 | 96 | 96 |
| CO | 71 | 89 | 89 | 90 |
| NO$_x$ | 75 | 87 | 88 | 88 |
| Air to Fuel Ratio of 14.56 | | | | |
| HC | 92 | 96 | 96 | 96 |
| CO | 74 | 98 | 97 | 98 |
| NO$_x$ | 77 | 95 | 94 | 96 |
| Air to Fuel Ratio of 14.25 | | | | |
| HC | 68 | 77 | 79 | 77 |
| CO | 29 | 28 | 25 | 28 |
| NO$_x$ | 94 | 100 | 100 | 100 |
| T50% Conversion | | | | |
| HC | 385 | 362 | 360 | 363 |
| CO | 394 | 369 | 366 | 368 |
| NO$_x$ | 388 | 358 | 352 | 355 |

In Table 10, non fuel-cut aging for 100 hrs was done along with FTP on a 3.1L V-6 vehicle with 1998 EMS Calibration.

TABLE 10

| | Bag Tailpipe Emissions g/mile (% Conversion) | | |
|---|---|---|---|
| Example Number | NMHC | CO | NOx |
| C9 | 0.175 (92.0) | 2.41 (80.6) | 0.404 (80.2) |
| 10 | 0.134 (93.3) | 1.95 (83.5) | 0.212 (88.1) |
| 11 | 0.131 (93.6) | 2.01 (83.3) | 0.216 (88.6) |
| 12 | 0.139 (92.7) | 2.00 (81.4) | 0.215 (86.6) |

Apparent in the data shown in Table 9 is that after the non fuel-cut aging, Examples 10, 11, and 12 having the macro porous aluminum oxides and oxygen storage components have higher performance than Example C9. This same trend is observed in FTP testing shown in Table 10.

Summarized in Tables 11, 12, and 13 are the test results of Example C9 and Examples 10 to 12 after "fuel-cut" aging. The best performance observed is again for Examples 10 to 12, all of which include the macro-pore aluminum oxide component (γ-Al$_2$O$_3$ or La-γ-Al$_2$O$_3$) in combination with the macro-pore oxygen storage component material $Ce_{0.25}Zr_{0.65}La_{0.04}Y_{0.06}O_{0.95}$.

TABLE 11

| | Oxygen Storage Component Switching Time (sec) | |
|---|---|---|
| Example Number | RICH → LEAN | LEAN → RICH |
| C9 | 1.2 | 1.3 |
| 10 | 3.3 | 2.7 |
| 11 | 4.4 | 3.6 |
| 12 | 2.7 | 2.2 |

In Table 12 further performance results are shown for catalysts where macro porous oxygen storage components and macro porous aluminum oxide are included together in the washcoat. The Pd and Rh loading is 40 g/ft$^3$ at a 0:5:1 (Pt:Pd:Rh) ratio. The catalyst volume is 75 in$^3$ and fuel cut aging for 100 hrs was done followed by A/F traverse testing at 400° C. and an air/fuel of ±0.6 A/F units at 1 Hz. The GHSV was 35,000 h$^{-1}$.

TABLE 12

| | Example Number | | | |
|---|---|---|---|---|
| COP | C9 | 10 | 11 | 12 |
| Cross Over Point (% Conversion) | | | | |
| | 76.4 | 73.2 | 95.2 | 88.2 |
| A/F Traverse Performance Data (% Conversion) | | | | |
| Integral conversions in A/F range 14.71 to 14.41 | | | | |
| HC | 90 | 93 | 97 | 94 |
| CO | 74 | 72 | 88 | 83 |
| NO$_x$ | 76 | 75 | 87 | 83 |
| Air to Fuel Ratio of 14.56 | | | | |
| HC | 90 | 93 | 97 | 95 |
| CO | 75 | 73 | 96 | 89 |
| NO$_x$ | 80 | 74 | 93 | 88 |
| Air to Fuel Ratio of 14.25 | | | | |
| HC | 66 | 70 | 66 | 66 |
| CO | 33 | 30 | 31 | 30 |
| NO$_x$ | 92 | 99 | 100 | 100 |
| T50% Conversion | | | | |
| HC | 372 | 384 | 370 | 378 |
| CO | 374 | 393 | 376 | 384 |
| NO$_x$ | 365 | 383 | 367 | 377 |

In Table 13 ECE/EUDC performance from a 1.6L, 16V vehicle with EURO-111 Calibration are presented.

TABLE 13

| Example Number | Bag Tailpipe Emissions g/mile (% Conversion) | | |
|---|---|---|---|
| | NMHC | CO | NO$_x$ |
| C9 | 0.426 (72.2) | 1.89 (68.9) | 0.309 (84.4) |
| 10 | 0.388 (74.9) | 1.86 (70.4) | 0.222 (90.8) |
| 11 | 0.332 (77.9) | 1.55 (74.8) | 0.162 (93.6) |
| 12 | 0.384 (75.5) | 1.71 (72.8) | 0.204 (92.7) |

The test results shown in Tables 14 to 18 represent two-layer three way conversion-catalysts. Example C13 represents a 2-layer system having a comparative aluminum oxide and oxygen storage component in both layers. Examples 14 to 16 represent variations of Example C13, wherein the aluminum oxide, oxygen storage component, or both, in one or both layers is replaced with a macro component. Specifically, Examples 14, 15, and 16 have both a macro-pore aluminum oxide component and a macro-pore oxygen storage component. Example 16 has a calcined version of the macro-pore γ-Al$_2$O$_3$ (θ-Al$_2$O$_3$) located in the Rh layer.

The Pd and Rh loading was 40 g/ft$^3$ at 0:5:1 (Pt:Pd:Rh) ratio and non fuel-cut aging for 100 hrs was used. Vehicle testing was done using the FTP test on a 3.1 L, V-6 vehicle with 1998 EMS calibration. Once again, the data in Tables 14 to 18 show a performance benefit for Examples 14, 15, and 16, over Example C13.

TABLE 14

| Example Number | Bag Tailpipe Emissions g/mile (% Conversion) | | |
|---|---|---|---|
| | NMHC | CO | NO$_x$ |
| C13 | 0.233 (88.6) | 2.62 (78.7) | 0.333 (82.3) |
| 14 | 0.213 (89.5) | 2.23 (81.4) | 0.290 (83.5) |
| 15 | 0.201 (90.2) | 2.22 (81.8) | 0.220 (88.4) |
| 16 | 0.218 (89.7) | 2.18 (82.0) | 0.288 (85.3) |

In Table 15, non fuel-cut aging for 100 hrs. was used with A/F traverse testing at 400° C. and an A/F amplitude of ±0.6 A/F units@1 Hz. The GHSV was 35,000 h$^{-1}$.

TABLE 15

| COP | Example Number | | | |
|---|---|---|---|---|
| | C13 | 14 | 15 | 16 |
| Cross Over Point (% Conversion) | | | | |
| | 68.1 | 79.6 | 95.3 | 84.1 |
| A/F Traverse Performance Data (% Conversion) | | | | |
| Integral conversions in A/F range 14.71 to 14.41 | | | | |
| HC | 81 | 88 | 92 | 90 |
| CO | 65 | 77 | 89 | 84 |
| NO$_x$ | 70 | 78 | 88 | 84 |
| Air to Fuel Ratio of 14.56 | | | | |
| HC | 82 | 89 | 93 | 91 |
| CO | 67 | 80 | 95 | 89 |
| NO$_x$ | 71 | 78 | 93 | 57 |
| Air to Fuel Ratio of 14.25 | | | | |
| HC | 53 | 59 | 58 | 58 |
| CO | 31 | 34 | 37 | 38 |
| NO$_x$ | 83 | 96 | 99 | 99 |
| T50% Conversion | | | | |
| HC | 395 | 390 | 380 | 381 |
| CO | 402 | 400 | 385 | 386 |
| NO$_x$ | 395 | 388 | 374 | 378 |

In Tables 16 and 17 the performance data after fuel cut aging for 100 hrs. are presented. A/F traverse testing was done at 400° C. using an A/F amplitude of ±0.6 A/F units at 1 Hz and a GHSV of 35,000 h$^{-1}$. The data are presented in Table 16.

TABLE 16

| COP | Example Number | | | |
|---|---|---|---|---|
| | C13 | 14 | 15 | 16 |
| Cross Over Point (% Conversion) | | | | |
| | 69.0 | 89.7 | 99.7 | 95.9 |
| A/F Traverse Performance Data (% Conversion) | | | | |
| Integral conversions in A/F range 14.71 to 14.41 | | | | |
| HC | 86 | 95 | 96 | 95 |
| CO | 66 | 85 | 94 | 90 |
| NO$_x$ | 73 | 85 | 91 | 89 |
| Air to Fuel Ratio of 14.56 | | | | |
| HC | 87 | 95 | 98 | 96 |
| CO | 68 | 90 | 100 | 96 |
| NO$_x$ | 75 | 90 | 100 | 94 |
| Air to Fuel Ratio of 14.25 | | | | |
| HC | 62 | 61 | 60 | 61 |
| CO | 33 | 35 | 37 | 38 |
| NO$_x$ | 93 | 100 | 100 | 100 |
| T50% Conversion | | | | |
| HC | 385 | 368 | 359 | 363 |
| CO | 388 | 370 | 361 | 364 |
| NO$_x$ | 383 | 363 | 353 | 356 |

TABLE 17

| Example Number | Oxygen Storage Component Switching Time (sec) | |
|---|---|---|
| | RICH → LEAN | LEAN → RICH |
| C13 | 2.3 | 1.6 |
| 14 | 4.0 | 3.2 |
| 15 | 5.5 | 4.4 |
| 16 | 3.6 | 2.6 |

Table 18 shows the performance results for ECE/EUDC testing on the 1.6L vehicle with EURO-III calibration after 100 hours of fuel cut aging.

TABLE 18

| Example Number | Bag Tailpipe Emissions g/mile (% Conversion) | | |
|---|---|---|---|
| | NMHC | CO | NO$_x$ |
| C13 | 0.522 (65.9) | 2.76 (60.2) | 0.415 (80.6) |
| 14 | 0.393 (74.3) | 1.95 (70.8) | 0.240 (89.7) |
| 15 | 0.363 (76.4) | 1.47 (76.7) | 0.184 (92.9) |
| 16 | 0.409 (72.6) | 1.81 (71.7) | 0.217 (90.5) |

Shown in Table 19 are the performance results for a single layer Pt and Rh three way conversion catalyst after aging for 50 hours according to the non fuel-cut protocol. Also shown are porosity features of the engine aged catalyst. After the 50 hours of non-fuel cut aging the aged washcoat was removed and analyzed for surface area, total pore volume and the pore volume associated with pores in the pore diameter range of 300 Å to 1,000 Å range. Example C20 has a higher precious metal component loading as compared to Example C17, and Examples 18 and 19. Example 18 has a macro-pore oxygen storage component in the washcoat, and Example 19 includes both a macro-pore oxygen storage component and a macro aluminum oxide component in the washcoat.

In Table 19 the performance results after non fuel-cut aging for 50 hrs. are shown. The A/F traverse test was done at 400° C. with an A/F amplitude of ±0.6 A/F units at 1 Hz. A GHSV of 35,000 h$^{-1}$ was used.

TABLE 19

| COP | Example Number | | | |
|---|---|---|---|---|
| | C17 | 18 | 19 | C20 |
| Cross Over Point (% Conversion) | | | | |
| | 72.0 | 77.7 | 91.1 | 79.4 |
| A/F Traverse Performance Data (% Conversion) | | | | |
| Integral conversions in A/F range 14.71 to 14.41 | | | | |
| HC | 80 | 84 | 87 | 87 |
| CO | 68 | 74 | 87 | 77 |
| NO$_x$ | 76 | 81 | 90 | 81 |
| Air to Fuel Ratio of 14.56 | | | | |
| HC | 80 | 85 | 90 | 88 |
| CO | 68 | 75 | 91 | 79 |
| NO$_x$ | 77 | 81 | 93 | 82 |
| Air to Fuel Ratio of 14.25 | | | | |
| HC | 58 | 60 | 54 | 60 |
| CO | 36 | 38 | 38 | 37 |
| NO$_x$ | 97 | 100 | 100 | 100 |
| T50% Conversion | | | | |
| HC | 377 | 373 | 371 | 370 |
| CO | 372 | 369 | 366 | 368 |
| NO$_x$ | 347 | 377 | 344 | 343 |
| Aged Surface Area and Porosity | | | | |
| Surface Area m$^2$/g | 45 | 57.3 | 45.8 | |
| Pore Volume (cm$^3$/g) 300 Å to 1000 Å | 0.063 | 0.165 | 0.195 | |

TABLE 19-continued

| COP | Example Number | | | |
|---|---|---|---|---|
| | C17 | 18 | 19 | C20 |
| Total Pore Volume (cm$^3$/g) | 0.227 | 0.317 | 0.311 | |

The data shows that the two example catalysts have improved performance over the comparative examples, even for Example C20, in which a higher precious metal component loading is present. In addition, it is demonstrated that performance does not correlate with either catalyst total pore volume or surface area, but instead correlates with porosity associated with pores in the macro pore range of 300 Å to 1,000 Å.

Tables 20, 21, and 22 show further comparisons for single layer Pt, Rh catalysts where performance advantages are again observed using macro porous aluminum oxide components and macro-pore oxygen storage components. Table 20 compares the performance results and porosity features after non fuel-cut aging. Tables 21 and 22 show the performance results and porosity features after fuel cut aging.

In Table 20, the Pt and Rh loading was 25 g/ft$^3$ at a 3:0:1 ratio. The catalyst volume was 75 in$^3$. Non fuel cut aging for 50 hrs was used. A/F traverse testing was done at 482° C. with a A/F amplitude of ±0.8 A/F units at 1 Hz. The GHSV was 42,000 h$^{-1}$

TABLE 20

| COP | Example Number | | | |
|---|---|---|---|---|
| | C17 | 18 | 19 | C20 |
| Cross Over Point (% Conversion) | | | | |
| | 77.8 | 95.2 | 99.3 | 79.7 |
| A/F Traverse Performance Data (% Conversion) | | | | |
| Integral conversions in A/F range 14.71 to 14.41 | | | | |
| HC | 91 | 95 | 95 | 91 |
| CO | 72 | 88 | 90 | 75 |
| NO$_x$ | 81 | 91 | 92 | 82 |
| Air to Fuel Ratio of 14.56 | | | | |
| HC | 92 | 96 | 97 | 92 |
| CO | 75 | 95 | 100 | 79 |
| NO$_x$ | 84 | 96 | 99 | 84 |
| Air to Fuel Ratio of 14.25 | | | | |
| HC | 71 | 72 | 68 | 70 |
| CO | 34 | 35 | 34 | 35 |
| NO$_x$ | 96 | 100 | 100 | 98 |
| T50% Conversion | | | | |
| HC | 395 | 391 | 379 | 397 |
| CO | 391 | 392 | 375 | 396 |
| NO$_x$ | 363 | 358 | 349 | 365 |
| Aged Surface Area and Porosity | | | | |
| Surface Area m$^2$/g | 59.1 | 57 | 49.7 | |
| Pore Volume (cm$^3$/g) 300 Å to 1000 Å | 0.078 | 0.135 | 0.196 | |
| Total Pore Volume (cm$^3$/g) | 0.298 | 0.305 | 0.335 | |

In Table 21 the performance data after fuel cut aging for 50 hrs. are presented. A/F traverse testing was done at 400° C. with a A/F amplitude of ±0.6 A/F units at 1 Hz. The GHSV was 35,000 h$^{-1}$.

TABLE 21

|  | \multicolumn{4}{c}{Example Number} |  |  |
| --- | --- | --- | --- | --- |
| COP | C17 | 18 | 19 | C20 |
| \multicolumn{5}{c}{Cross Over Point (% Conversion)} |
|  | 64.0 | 99.3 | 84.0 | 64.2 |
| \multicolumn{5}{c}{A/F Traverse Performance Data (% Conversion)} |
| \multicolumn{5}{c}{Integral conversions in A/F range 14.71 to 14.41} |
| HC | 67 | 95 | 84 | 74 |
| CO | 56 | 90 | 83 | 61 |
| NO$_x$ | 69 | 92 | 84 | 68 |
| \multicolumn{5}{c}{Air to Fuel Ratio of 14.56} |
| HC | 67 | 97 | 84 | 74 |
| CO | 56 | 100 | 84 | 60 |
| NO$_x$ | 69 | 99 | 84 | 68 |
| \multicolumn{5}{c}{Air to Fuel Ratio of 14.25} |
| HC | 45 | 68 | 54 | 53 |
| CO | 33 | 34 | 37 | 35 |
| NO$_x$ | 85 | 100 | 100 | 92 |
| \multicolumn{5}{c}{T50% Conversion} |
| HC | 400 | 379 | 385 | 393 |
| CO | 407 | 375 | 386 | 398 |
| NO$_x$ | 385 | 349 | 366 | 378 |
| \multicolumn{5}{c}{Aged Surface Area and Porosity} |
| Surface Area m$^2$/g |  | 49.1 | 51.1 | 46.6 |
| Pore Volume (cm$^3$/g) 300 Å to 1,000 Å |  | 0.053 | 0.124 | 0.154 |
| Total Pore Volume (cm$^3$/g) |  | 0.235 | 0.289 | 0.301 |

In Table 22 the performance for ECE/EUDC testing on a 1.6L, 16 V vehicle with EURO-III calibration after 50 hrs of fuel cut aging are presented.

TABLE 22

| | \multicolumn{3}{c}{Bag Tailpipe Emissions g/mile (% Conversion)} | |
| --- | --- | --- | --- |
| Example Number | NMHC | CO | NO$_x$ |
| C17 | 0.696 (53.7) | 2.59 (60.1) | 0.413 (84.2) |
| 18 | 0.531 (63.4) | 2.13 (67.5) | 0.290 (88.2) |
| 19 | 0.571 (61.9) | 2.48 (64.6) | 0.306 (88.0) |
| C20 | 0.624 (57.8) | 2.7 (60.8) | 0.369 (86.0) |

Improved performance for the two examples that contain the macro porous oxygen storage component and the macro-pore aluminum oxide component are observed in light-off and air to fuel traverse activity. It is also observed that performance does not correlate with surface area or total pore volume, but instead correlates with the pore volume associated with pores in the pore diameter range of 300 Å to 1,000 Å.

Accordingly, the macro porous aluminum oxide, the macro-pore oxygen storage component, or both result in an improved three-way conversion catalyst performance, even when a single layer macro catalyst is evaluated next to a comparative two layer catalyst, and when the precious metal loading in the comparative catalysts was nearly double that of the macro catalysts. The porosity features of the aged catalyst suggest an improved mass transfer between the exhaust gas and the catalytically active components of the catalyst that results in the observed performance improvement.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A catalyst, comprising:
   a catalytic metal component; and
   a macro-pore component comprising an oxygen storage component and an aluminum oxide component, wherein the oxygen storage component, the aluminum oxide component, or both comprise pores, and wherein greater than or equal to about 40% of a macro-pore component pore volume, based on a total macro-pore component pore volume, is associated with pores greater than 120 Å in diameter; and further wherein at least about 40% of an oxygen storage component pore volume, based on a total oxygen storage component pore volume is associated with pores that are about 200 Å to about 800 Å in diameter.

2. The catalyst of claim 1, wherein greater than or equal to about 40% of the macro-pore component pore volume is associated with pores greater than 120 Å to about 1,000 Å in diameter.

3. The catalyst of claim 2, wherein greater than or equal to about 40% of the macro-pore component pore volume is associated with pores that are about 180 Å to about 800 Å in diameter.

4. The catalyst of claim 1, wherein greater than or equal to about 50% of the macro-pore component pore volume is associated with pores that are greater than 120 Å to about 1,000 Å in diameter.

5. The catalyst of claim 4, wherein greater than or equal to about 80% of the macro-pore component pore volume is associated with pores that are greater than 120 Å to about 1,000 Å in diameter.

6. The catalyst of claim 5, wherein greater than or equal to about 80% of the macro-pore component pore volume is associated with pores that are about 180 Å to about 800 Å in diameter.

7. The catalyst of claim 4, wherein greater than or equal to about 50% of the macro-pore component pore volume is associated with pores that are about 180 Å to about 800 Å in diameter.

8. The catalyst of claim 1, wherein greater than or equal to about 40% of an aluminum oxide pore volume, based on a total aluminum oxide pore volume, is associated with pores that are about 220 Å to about 800 Å in diameter.

9. The catalyst of claim 8, wherein at least about 50% of the aluminum oxide pore volume, based on the total aluminum oxide pore volume is associated with pores that are about 220 Å to about 800 Å in diameter.

10. The catalyst of claim 9, wherein at least about 80% of the aluminum oxide pore volume, based on the total aluminum oxide pore volume, is associated with pores that are about 220 Å to about 800 Å in diameter.

11. The catalyst of claim 1, wherein at least about 50% of the oxygen storage component pore volume, based on the total oxygen storage component pore volume, is associated with pores that are about 200 Å to about 800 Å in diameter.

12. The catalyst of claim 11, wherein at least about 80% of the oxygen storage component pore volume, based on the total oxygen storage component pore volume, is associated with pores that are about 200 Å to about 800 Å in diameter.

13. The catalyst of claim 1, wherein the catalytic metal component, the oxygen storage component, and the aluminum oxide component are disposed as a layer on a substrate.

14. The catalyst of claim 13, wherein the layer is about 20 micrometers to about 170 micrometers thick.

15. The catalyst of claim 13, further comprising a plurality of layers disposed on the substrate.

16. The catalyst of claim 1, wherein the catalytic metal component comprises palladium.

17. The catalyst of claim 16, wherein the catalytic metal component comprises rhodium.

18. The catalyst of claim 1, wherein the catalytic metal component comprises platinum.

19. The catalyst of claim 1, wherein the aluminum oxide has a surface area of greater than or equal to about 40 square meters per gram.

20. The catalyst of claim 1, wherein the oxygen storage component has a surface area of greater than or equal to about 20 square meters per gram.

* * * * *